United States Patent
Feng et al.

(10) Patent No.: US 7,363,825 B2
(45) Date of Patent: Apr. 29, 2008

(54) NON-CONTACT POSITION SENSOR HOUSING USING EXISTING TORQUE SENSOR PROBE

(75) Inventors: Sanian Feng, Saginaw, MI (US); Christian Ross, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 377 days.

(21) Appl. No.: 11/053,329

(22) Filed: Feb. 8, 2005

(65) Prior Publication Data

US 2006/0236784 A1    Oct. 26, 2006

(51) Int. Cl.
*G01L 3/02*    (2006.01)
(52) U.S. Cl. .................................. 73/862.325
(58) Field of Classification Search ..............................
73/862.331–862.333, 862.325, 862.365
See application file for complete search history.

(56) References Cited

U.S. PATENT DOCUMENTS

| | | | | |
|---|---|---|---|---|
| 4,350,212 A | * | 9/1982 | Hirose .............................. 173/6 |
| 4,874,053 A | * | 10/1989 | Kimura et al. .............. 180/443 |
| 5,404,775 A | * | 4/1995 | Abe ............................... 81/469 |
| 5,544,526 A | * | 8/1996 | Baltins et al. ................. 73/180 |
| 5,828,136 A | * | 10/1998 | Yang ............................ 290/4 A |
| 5,924,519 A | * | 7/1999 | Shimizu et al. ............. 180/444 |
| 6,578,437 B1 | | 6/2003 | Moerbe |
| 6,619,056 B2 | * | 9/2003 | Midden et al. ................ 62/136 |
| 6,820,713 B2 | * | 11/2004 | Menjak et al. .............. 180/402 |
| 7,174,795 B2 | * | 2/2007 | Feng et al. ............. 73/862.332 |
| 2003/0102181 A1 | | 6/2003 | Tokumoto |
| 2005/0172732 A1 | * | 8/2005 | Feng et al. ............. 73/862.332 |

FOREIGN PATENT DOCUMENTS

| EP | 1 342 646 | 9/2003 |
|---|---|---|
| EP | 1 541 983 | 6/2005 |
| GB | 643 823 | 9/1950 |

OTHER PUBLICATIONS

European Search Report dated Jul. 5, 2006.

* cited by examiner

*Primary Examiner*—Max Noori
(74) *Attorney, Agent, or Firm*—Michael D. Smith

(57) ABSTRACT

A sensors casing supports torque sensors and the position sensors and segment magneto-sensitive elements to detect the relative rotation between an input shaft and an output shaft and the angular position of the shafts in a steering column housing. The sensor casing is removeably attached to the support housing by a mounting flange for detaching the electrical components from the steering column housing assembly.

29 Claims, 8 Drawing Sheets

NON-CONTACT POSITION SENSOR HOUSING USING EXISTING TORQUE SENSOR PROBE

BACKGROUND OF THE INVENTION

1. Field of the Invention

A probe module for a position detection assembly for measuring the relative rotational movement between an input shaft and an output shaft and for measuring the angular position of the shafts relative to a support housing of the type used in an automotive steering column.

2. Description of the Prior Art

The need to measure both the torque and the angular position of a steering shaft is important in automotive applications utilizing an electric power steering system (EPS). Generally, it is necessary to calculate the torque in order to determine the amount of electrical assist to apply when a driver turns a steering wheel to rotate an input shaft. The input shaft is coupled to an output shaft by a torsion bar and the output shaft is connected to a steering mechanism. The torsion bar allows the input shaft to rotate with respect to the output shaft by a predetermined number of degrees and a torque probe senses the relative rotational movement between the input shaft and the output shaft.

Such systems also include a position probe for sensing the angular position of the shafts and a segment probe for determining in which revolution the shafts are rotating. The signal generated by these probes are transmitted electrically from the probes integrated into the steering column housing that rotatably supports input and output shafts for rotation about a steering axis.

In the event it is necessary to repair the probes it may be necessary to disassemble the steering column. In addition, the various probes may be separately supported in the assembly requiring each probe to be addressed independently of one another.

SUMMARY OF THE INVENTION AND ADVANTAGES

The subject invention provides for a sensor casing for removable attachment to the support housing and supporting both the torque probe and the position probe.

Accordingly, the torque probe and the position probe may be detached from the support housing together in a probe module. The probe module may be replaced in its entirety to replace one or all of the probes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
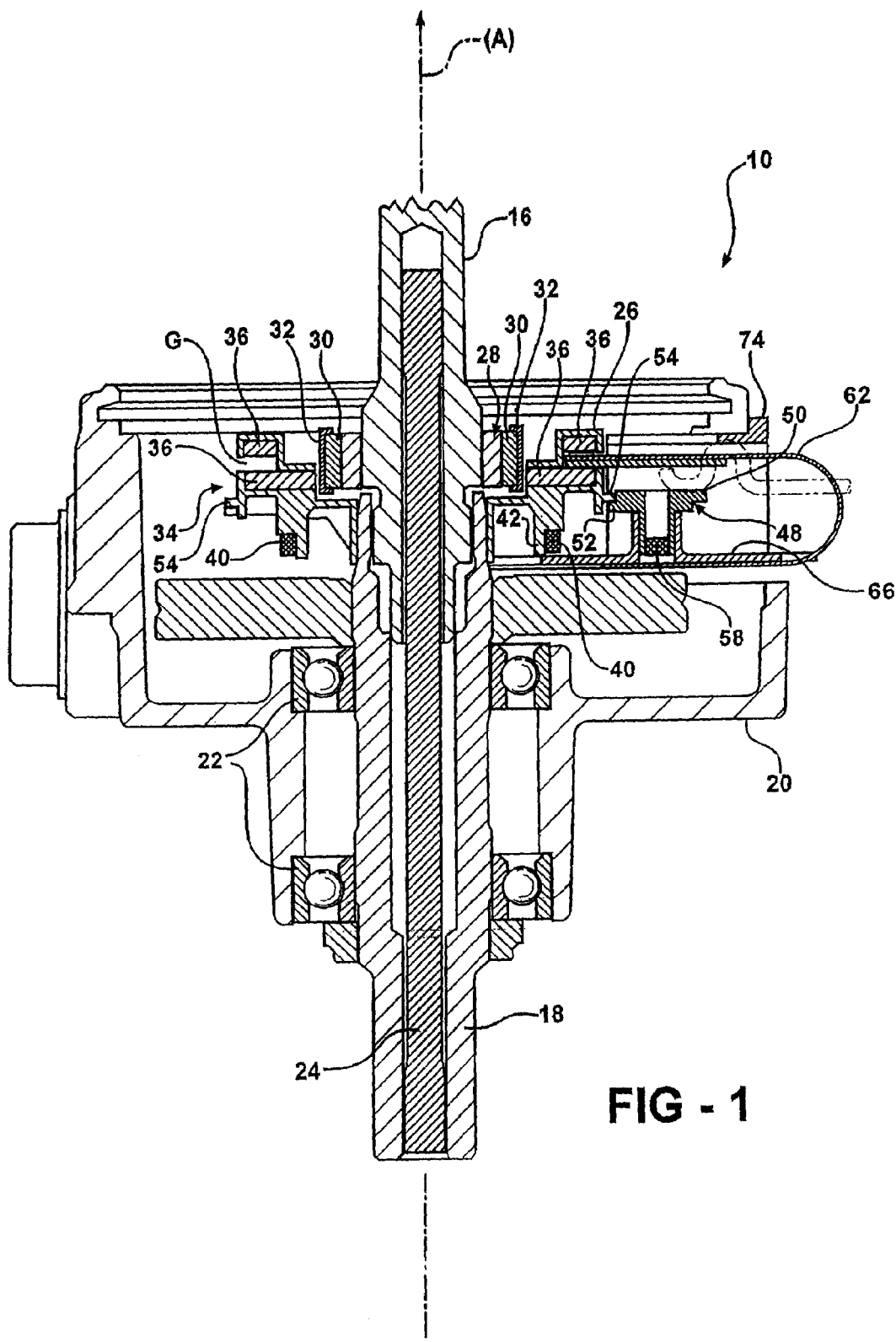
FIG. 1 is cross sectional view of an assembly incorporating the removable sensor casing of the subject invention.
Figure 2:
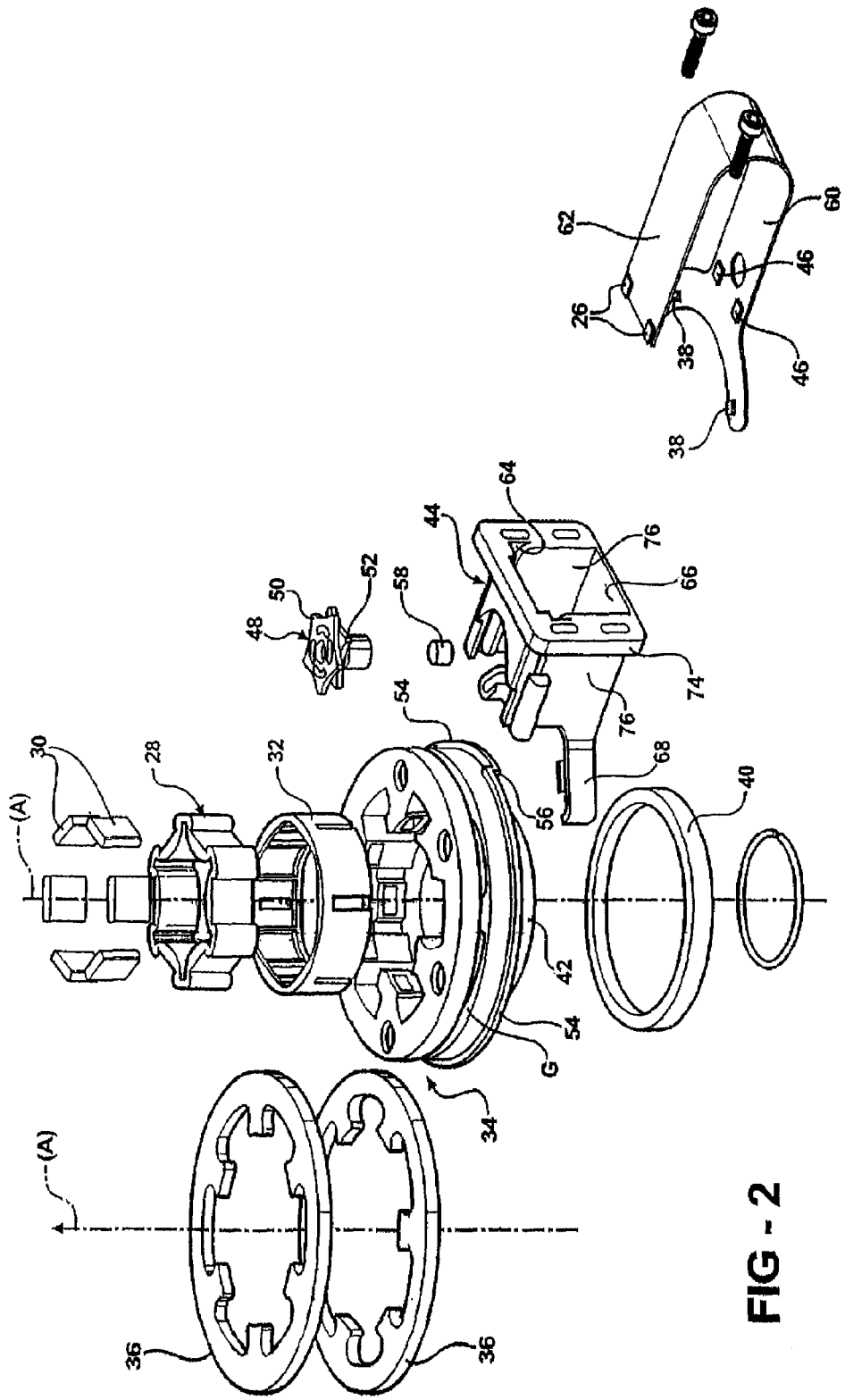
FIG. 2 is an exploded perspective view of the assembly shown in FIG. 1.
Figure 3:
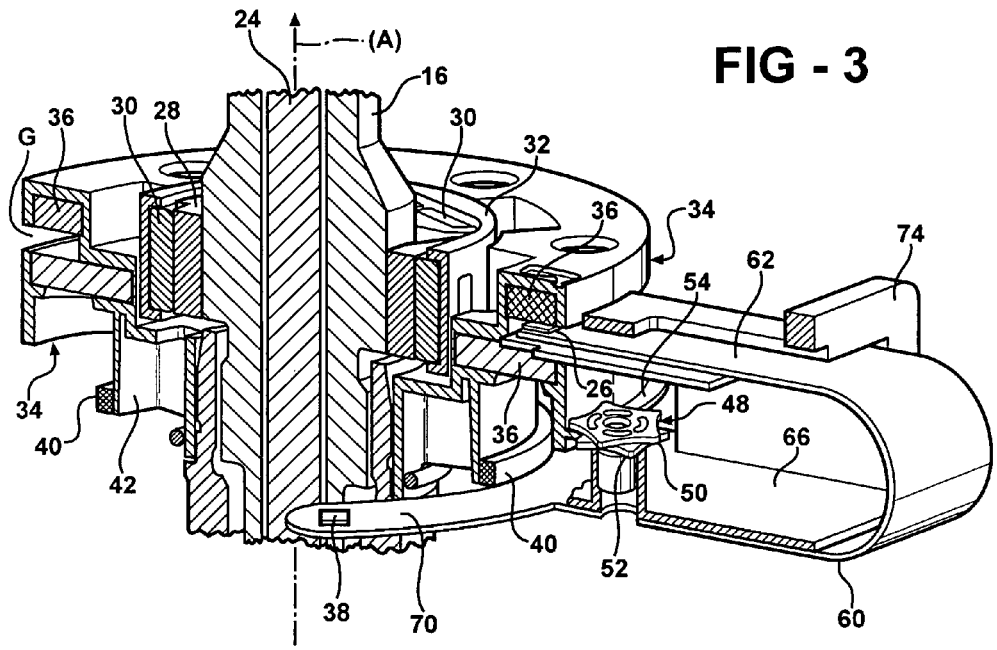
FIG. 3 is a perspective view cut away and in cross section of the assembly shown in FIGS. 1 and 2.
Figure 4:
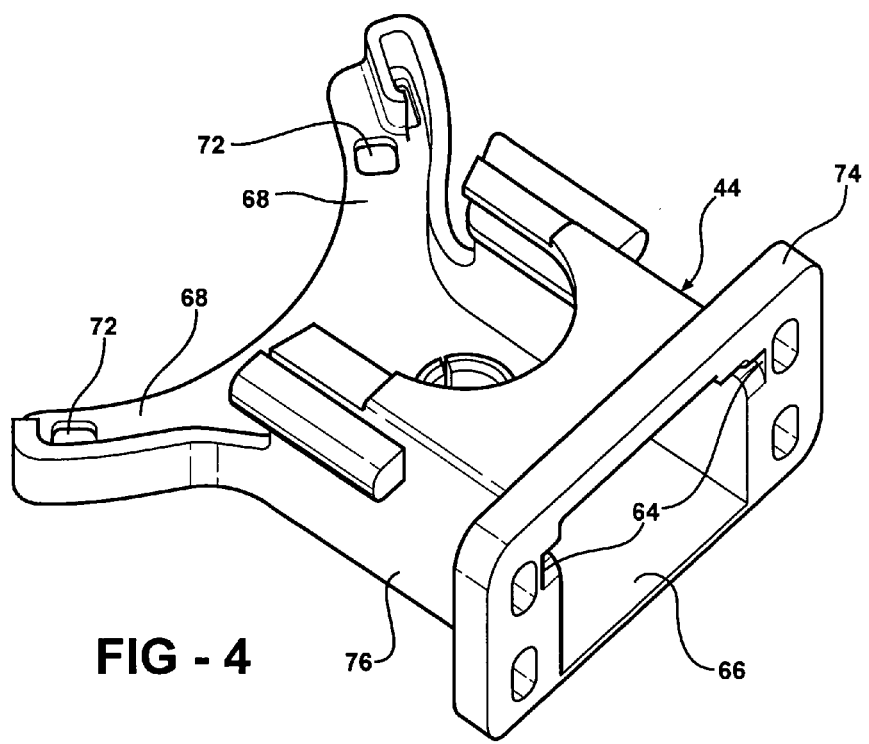
FIG. 4 is a perspective view of the sensor casing of the subject invention.
Figure 5:
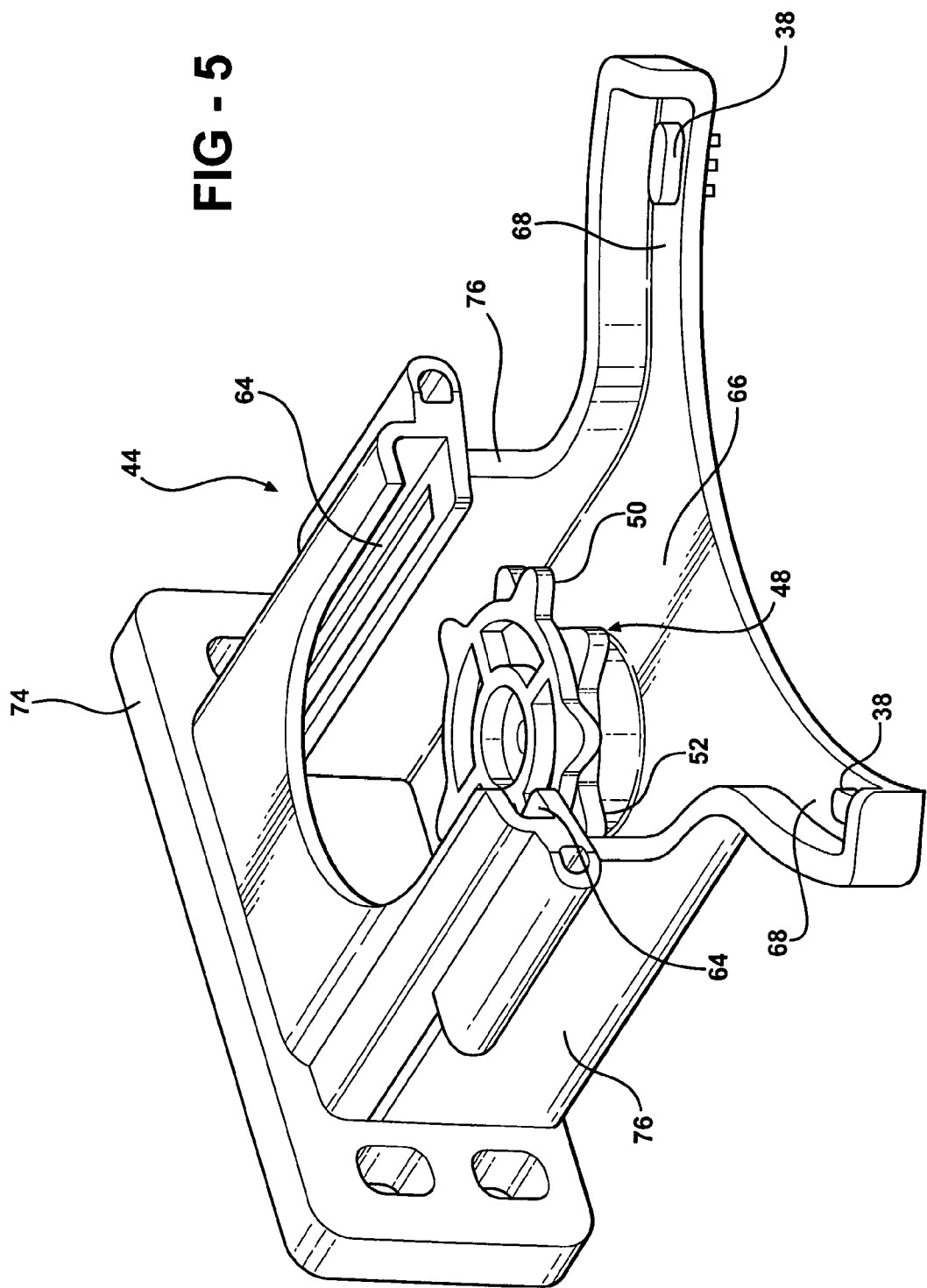
FIG. 5 is a perspective view of the sensor casing from the opposite direction than the directional view in FIG. 4.
Figure 6:
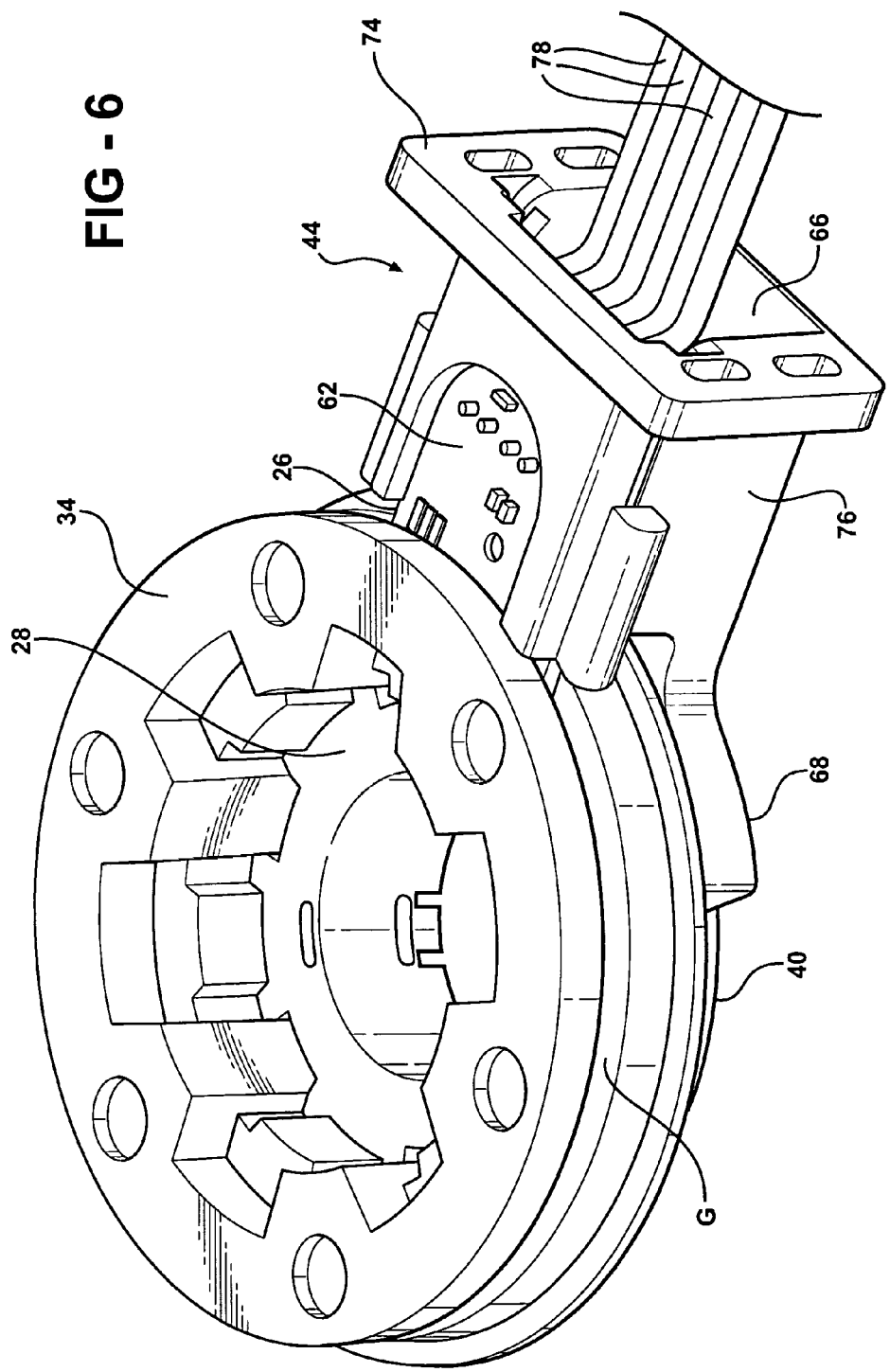
FIG. 6 is a perspective view of the sensor casing from the bottom and associated with part of the assembly.

An assembly for measuring the relative rotational movement between an input shaft 16 and an output shaft 18 and for measuring the angular position of the shafts is generally shown in FIGS. 1-3. The assembly includes a support housing 20 including bearings 22 for rotatably supporting the input shaft 16 for rotation about an axis A. The output shaft 18 axially aligned with and supported by the input shaft 16 for rotation about the axis A. A torsion bar 24 interconnects the shafts 16, 18 for allowing relative rotational movement between the shafts 16, 18 in response to a predetermined torque. The input shaft 16 is coupled to a steering wheel (not shown). The output shaft 18 is coupled to a steering system (not shown), for example, a rack and pinion gear mechanism. The entire assembly is more specifically described in co-pending application Ser. No. 11/036,806, filed on Jan. 14, 2005, and will be briefly described here.

The assembly includes a torque probe comprising a pair of torque sensors 26 for sensing a signal indicative of relative rotational movement between the input shaft 16 and the output shaft 18. A torque rotor 28 is rotated by the input shaft 16 and supports six magnets 30 in six circumferentially spaced pockets on the outer surface of the torque rotor 28 with a retainer ring 32 retaining the magnets 30 in the pockets.

A torque wheel 34 is rotated by the output shaft 18 and supports a pair of axially spaced torque stators 36 that are angularly offset or out of phase with each other. The axial displacement between the torque stators 36 defines a gap (G) for establishing a measurement zone through which the magnetic flux from the plurality of magnets 30 passes. The torque sensors 26 measure the magnetic flux generated by the magnets 30. As suggested above, the torque stators 36 are offset or out of phase with each other by way of radially inwardly directed torque. The magnetic flux measured by the torque sensors 26 varies depending on the alignment of the magnets 30 in the torque wheel 34 and the torque projections of the torque stators 36. The magnetic flux generated by each magnet 30 flows through the torque stators 36 to create a differential magnetic flux between the two torque stators 36 which flows through the gap (G) between the torque stators 36 and is sensed by the torque sensors 26. This differential magnetic flux is indicative of the relative or differential rotational movement between the input shaft 16 and the output shaft 18. At a no-load torque condition, both of the torque stators 36 produce the same amount of flux, hence the differential flux crossing through the gap (G) is zero.

A position probe comprising a pair of position sensors 38 sense a signal indicative of the angular position of at least one of the shafts 16, 18, preferably detecting the angular position of the output shaft 18 between any angle of and degrees. More specifically, the torque wheel 34 also supports a magnetic ring 40 that is axially spaced from the torque stators 36 by a depending skirt 42. The magnetic ring 40 rotates with the torque wheel 34 to generate a magnetic flux which corresponds to the incremental angle of the output shaft 18. The position sensors 38 detect the magnetic flux of the magnetic ring 40.

Figure 7:
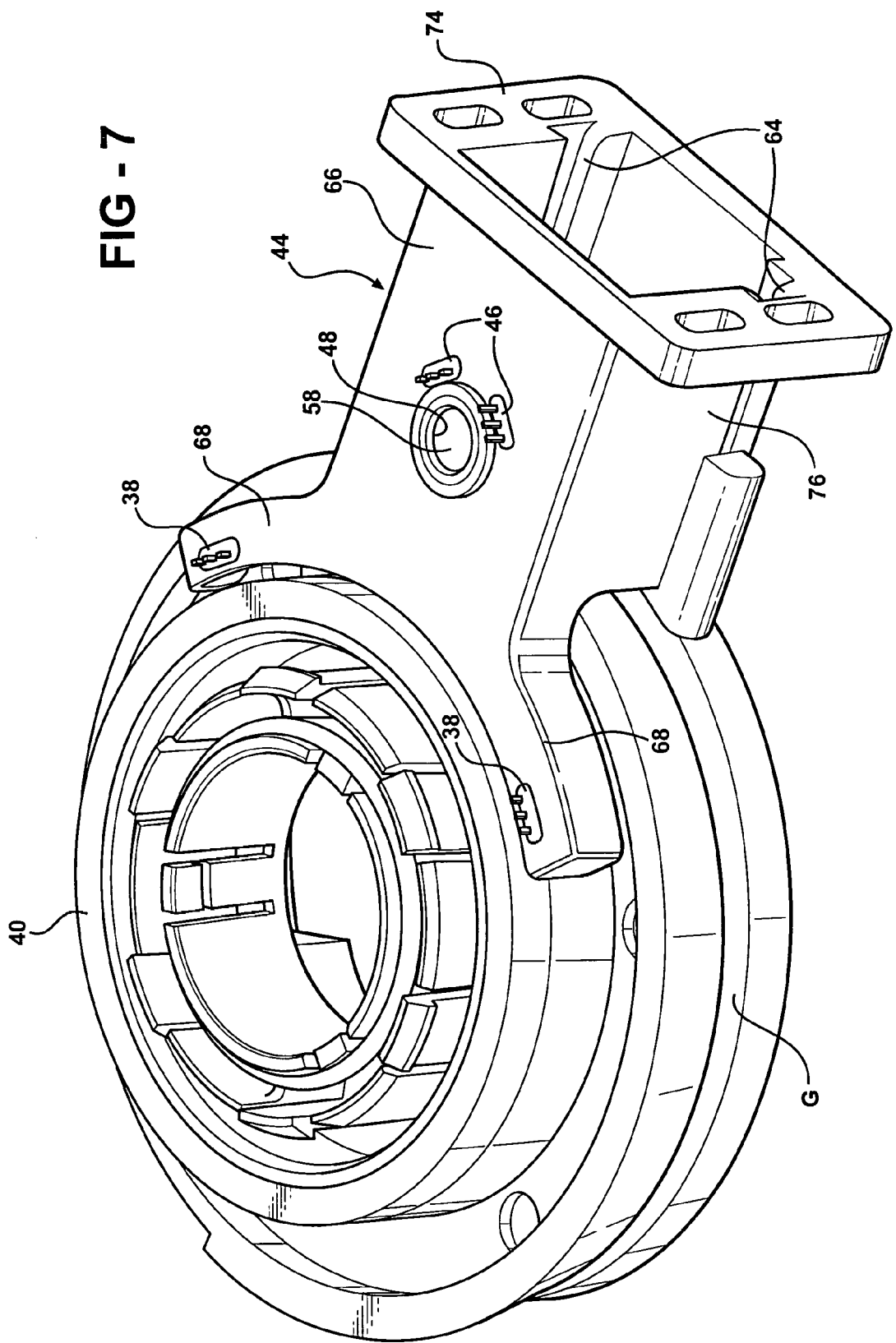
FIG. 7 is a perspective view of the sensor casing from the top and associated with part of the assembly.

As will be described more fully herein after, a sensor casing 44 supports the torque sensors 26 of the torque probe and the position sensors 38 of the position probe and is removably attached to the support housing 20 for detaching the torque probe and the position probe from the assembly. In addition, the sensor casing 44 supports a segment probe that includes a pair of segment magneto-sensitive elements 46 to provide a segment output indicative of the angular segment in which the shafts 16, 18, are disposed. In other words, the position sensors 38 may determine the angle of rotation in a given revolution, i.e., between zero and three hundred and sixty degrees, but can not determine the number of revolutions or in which revolution the shafts 16, 18, are disposed. The segment probe determines the revolution in which the shafts 16, 18, are disposed. The segment probe includes a change gear 48 rotatably supported by the sensor casing 44 for rotation through predetermined angular segments in response to rotation of the torque wheel 34. As best shown in FIG. 7, the sensor casing 44 includes a boss rotatably supporting and extending downwardly from the change gear 48.

The change gear 48 includes a plurality of first teeth 50 disposed in a first plane and a plurality of second teeth 52 disposed in a second plane spaced axially from the first plane with the first teeth 50 and the second teeth 52 being angularly offset and out of phase with each other. The torque wheel 34 includes a pair of blocking cams 54 in axially spaced planes corresponding to the planes of the teeth 50, 52 on the change gear 48 with each blocking cam 54 extending half way around the torque wheel 34, i.e., one hundred and eighty degrees. A pair of abutments 56 between the ends of the blocking cams 54 engages the teeth 50, 52 on the change gear 48 to rotate the change gear 48 in segments of a revolution. A magnetic segment 58 is carried by the post of the change gear 48 to provide magnetic flux sensed by the segment magneto-sensitive elements 46. Accordingly, the position of the change gear 48 is indicative of the revolution in which the output shaft 18 is disposed.

A circuit board is U-shaped between a position leg 60 and a torque leg 62. The sensor casing 44 includes a pair of opposing guide-ways 64 and the torque leg 62 of the circuit board slides into and extends between the guide-ways 64. The sensor casing 44 also includes a gear platform 66 having a top surface and a bottom surface extending parallel to and spaced from the guide-ways 64 and the position leg 60 of the circuit board slides over and is supported on the bottom surface of the gear platform 66. The change gear 48 is rotatably supported on the gear platform 66 and extends from the top surface toward the guide-ways 64. Accordingly, the segment probe interacts between the position leg 60 and the change gear 48 for providing a segment output indicative of the angular segment in which the torque wheel 34 is disposed. The torque leg 62 of the circuit board extends from the guide-ways 64 to a leading edge and the torque sensor 26 is disposed on that leading edge of the circuit board.

The sensor casing 44 includes a pair of casing arms 68 extending in opposite directions in a circular path from the gear platform 66 to distal ends. The position leg 60 of the circuit board includes a pair of circuit arms 70 extending in opposite directions in the same circular path to underlie the bottom surface of the casing arms 68 of the gear platform 66. The position sensors 38 are supported on the circuit arms 70 and extend upwardly through openings 72 in the casing arms 68.

The sensor casing 44 includes a mounting flange 74 removably attached to the support housing 20 by fasteners that threadedly engage the support housing 20. The gear platform 66 and the guide-ways 64 extend from the mounting flange 74 and include a top wall interconnecting the guide-ways 64 and side walls 76 interconnecting the top wall and the gear platform 66 to define an access in the flange through which electrical leads 78 are disposed.

The sensor casing 44 forms the basis of a probe module for a modular sensing assembly for measuring the relative rotational movement between an input shaft 16 and an output shaft 18 and for measuring the angular position of the shafts relative to a support housing 20, and for providing a segment output indicative of the angular segment in which the shafts are disposed. The mounting flange 74 facilitates the attachment and removal of all of the electrical components from the steering column for repair and/or replacement.

Figure 8:
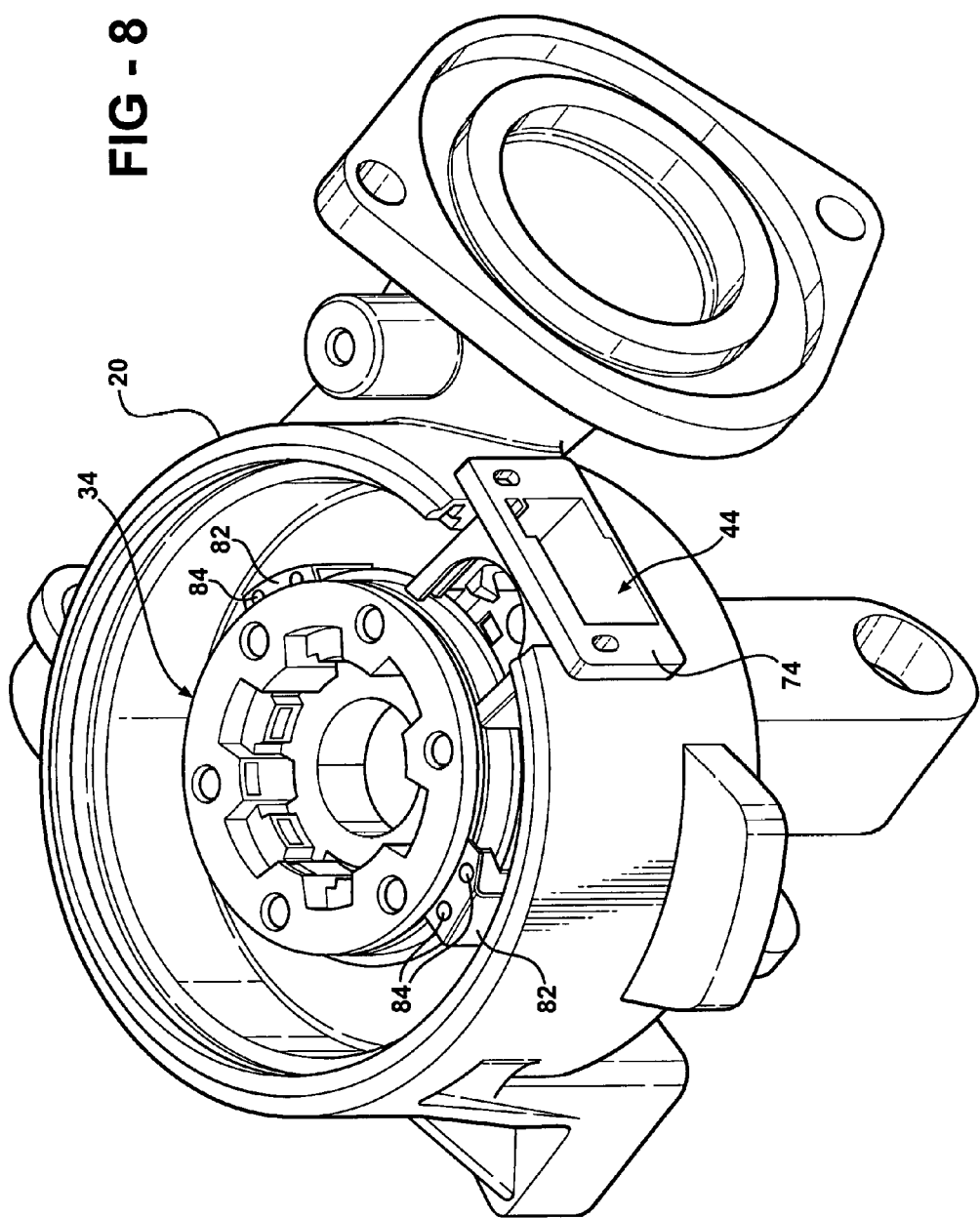
FIG. 8 is an exploded perspective view of the assembly but showing a slightly different configuration of the sensor casing arms.
Figure 9:
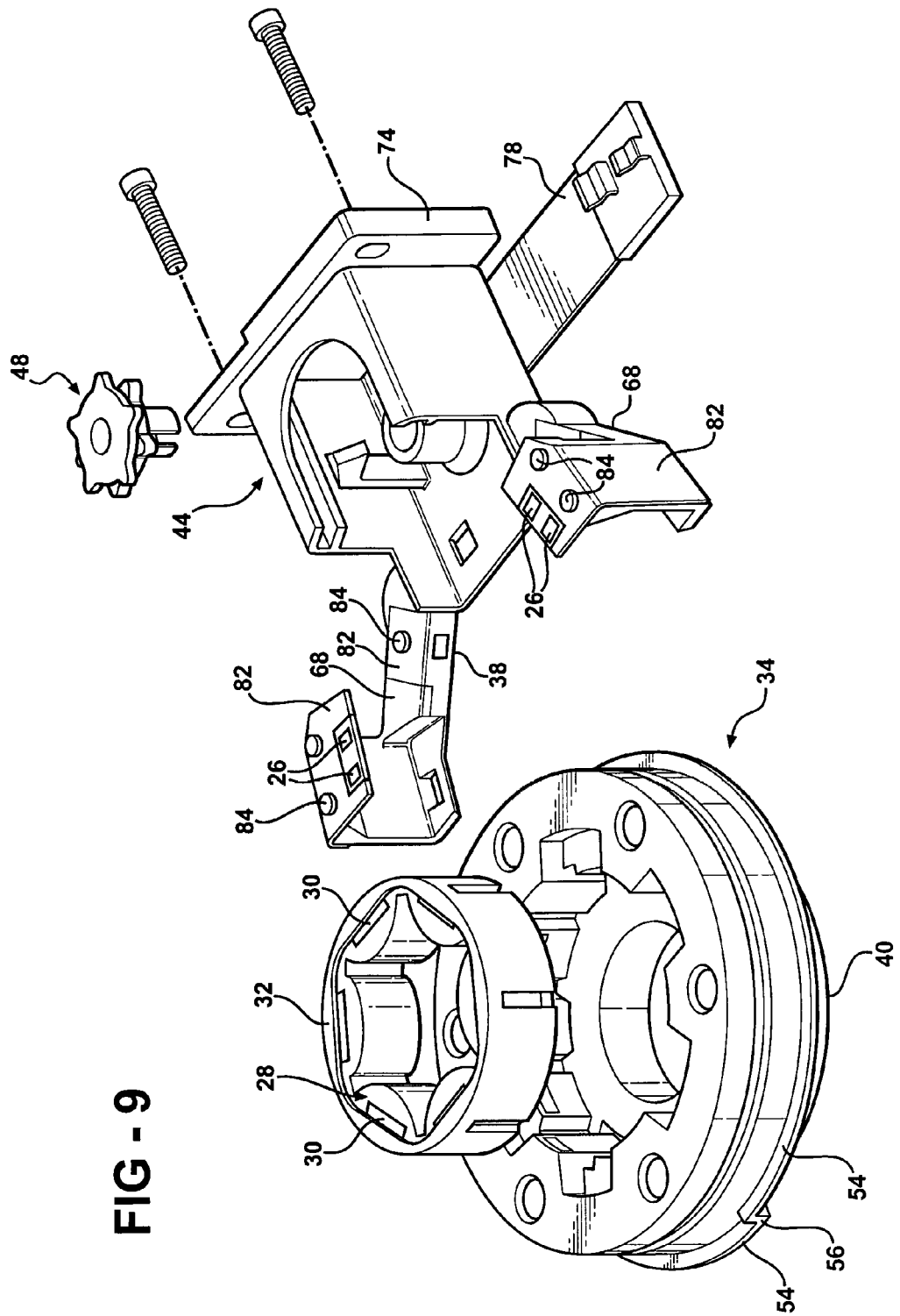
FIG. 9 is a perspective view of the assembly shown in FIG. 8 supported in a vehicle structure.

The assembly shown in FIGS. 8 and 9 is essentially the same as that shown in the previous FIGS. except for a slightly different configuration of the casing arms 68 and placement of the torque sensors 26 and the position sensors 38. More specifically, the position sensors 38 are disposed along the casing arms 68 and the torque sensors 26 are supported on risers or fingers 80 extending upwardly from the distal ends of the casing arms 68. In addition, the electrical leads 78 extend from the side of the sensor casing 44. The torque sensors 26 and the position sensors 38 are respectively mounted on flexboard 82 that is like circuit board and that may be heat staked to sensor casing 44 by integral stakes 84 that are softened with heat to lock the flexboard 82 in place.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A probe module for a position detection assembly for measuring the relative rotational movement between an input shaft and an output shaft and for measuring the angular position of said shafts relative to a support housing, said probe module comprising;

a torque probe for sensing a signal indicative of relative rotational movement between the input shaft and the output shaft, a position probe for sensing a signal indicative of the angular position of one of the shafts; and a sensor casing for removable attachment to the support housing and supporting said torque probe and said position probe.

2. A probe module as set forth in claim 1 including a segment probe supported on said sensor casing for providing a segment output indicative of the angular segment in which said shafts are disposed.

3. A probe module as set forth in claim 2 including a change gear rotatably supported by said sensor casing for rotation through predetermined angular segments in response to rotation of the shafts.

4. A probe module as set forth in claim 3 wherein said segment probe is responsive to said change gear for providing a segment output indicative of the angular segment in which said change gear is disposed.

5. A probe module as set forth in claim 4 wherein said segment probe includes a segment magnet rotated by said change gear for providing a magnetic flux indicative of the angular segment in which said change gear is disposed.

6. A probe module as set forth in claim 5 wherein said segment probe includes at least one segment magneto-sensitive element supported on said sensor casing for detecting the magnetic flux of said segment magnet to provide a segment output indicative of the angular segment in which the change gear is disposed.

7. A probe module as set forth in claim 3 including a circuit board supporting said torque probe and said position probe.

8. A probe module as set forth in claim 7 wherein said sensor casing includes a pair of opposing guide-ways and said circuit board includes a torque leg extending between said guide-ways.

9. A probe module as set forth in claim 8 wherein said sensor casing includes a gear platform having a top surface and a bottom surface and extending parallel to and spaced from said guide-ways, said change gear being rotatably supported on said gear platform and extending from said top surface toward said guide-ways.

10. A probe module as set forth in claim 9 wherein said circuit board includes a position leg supported on said bottom surface of said gear platform, a segment probe interacting between said position leg and said change gear for providing a segment output indicative of the angular segment in which said change gear is disposed.

11. A probe module as set forth in claim 3 wherein said sensor casing includes a gear platform having a top surface and a bottom surface, said change gear being rotatably supported on said gear platform and extending from said top surface, a segment magnet rotated by said change gear for providing a magnetic flux indicative of the angular segment in which said change gear is disposed and at least one segment magneto-sensitive element supported on said casing for detecting the magnetic flux of said segment magnet to provide a segment output indicative of the angular segment in which the change gear is disposed.

12. A probe module as set forth in claim 10 wherein said circuit board is U-shaped between said torque leg disposed in said guide-ways and said position leg engaging said bottom surface of said gear platform.

13. A probe module as set forth in claim 11 wherein said sensor casing includes a pair of casing arms extending in opposite directions in a circular path from said gear platform to distal ends.

14. A probe module as set forth in claim 13 wherein said position leg includes a pair of circuit arms extending in opposite directions in said circular path to underlie said bottom surface of said casing arms of said gear platform.

15. A probe module as set forth in claim 14 wherein said sensor casing includes a mounting flange for removably attaching said sensor casing to a support housing, said gear platform and said guide-ways extending from said mounting flange and including a top wall interconnecting said guide-ways and side walls interconnecting said top wall and said gear platform to define an access in said mounting flange.

16. A probe module as set forth in claim 13 wherein said change gear includes a plurality of first teeth disposed in a first plane and a plurality of second teeth disposed in a second plane spaced axially from said first plane with said first teeth and said second teeth being angularly offset and out of phase with each other.

17. A probe module as set forth in claim 13 wherein said position probe includes a position sensor on each of said casing arms.

18. A probe module as set forth in claim 14 wherein said torque leg of said circuit board extends from said guide-ways to a leading edge and said torque probe includes a torque sensor on said leading edge of said circuit board.

19. An assembly for measuring the relative rotational movement between an input shaft and an output shaft and for measuring the angular position of said shafts, said assembly comprising:
an input shaft;
an output shaft axially aligned with said input shaft for rotation about said axis;
a support housing for rotatably supporting said output shaft for rotation about an axis;
a torsion bar interconnecting said shafts for allowing relative rotational movement between said shafts in response to a predetermined torque,
a torque probe for sensing a signal indicative of relative rotational movement between said input shaft and said output shaft,
a position probe sensing a signal indicative of the angular position of one of said shafts; and
a sensor casing supporting said torque probe and said position probe and removably attached to said support housing for detaching said torque probe and said position probe from said assembly.

20. An assembly as set forth in claim 19 including a segment probe supported on said sensor casing for providing a segment output indicative of the angular segment in which said shafts are disposed.

21. An assembly as set forth in claim 20 including a change gear rotatably supported by said sensor casing for rotation through predetermined angular segments in response to rotation of said shafts.

22. An assembly as set forth in claim 21 including a circuit board supporting said torque probe and said position probe.

23. An assembly as set forth in claim 22 wherein said sensor casing includes a pair of opposing guide-ways and said circuit board includes a torque leg extending between said guide-ways.

24. An assembly as set forth in claim 21 wherein said sensor casing includes a gear platform having a top surface and a bottom surface, said change gear being rotatably supported on said gear platform and extending from said top surface.

25. An assembly as set forth in claim 24 wherein said circuit board includes a position leg supported on said bottom surface of said gear platform, a segment probe interacting between said position leg and said change gear for providing a segment output indicative of the angular segment in which said change gear is disposed.

26. An assembly as set forth in claim 25 wherein said circuit board is U-shaped between said torque leg disposed in said guide-ways and said position leg engaging said bottom surface of said gear platform.

27. An assembly as set forth in claim 24 wherein said sensor casing includes a pair of casing arms extending in opposite directions in a circular path from said gear platform to distal ends.

28. An assembly as set forth in claim 27 wherein said position leg includes a pair of circuit arms extending in opposite directions in said circular path to underlie said bottom surface of said casing arms of said gear platform.

29. An assembly as set forth in claim 27 wherein said sensor casing includes a mounting flange removably attached to said support housing, said gear platform and including a top wall and side walls interconnecting said top wall and said gear platform to define an opening in said flange.

* * * * *